United States Patent
Banerjee et al.

(10) Patent No.: US 10,444,809 B2
(45) Date of Patent: Oct. 15, 2019

(54) POWER DISTRIBUTION UNITS

(71) Applicant: HEWLETT PACKARD ENTERPRISE DEVELOPMENT LP, Houston, TX (US)

(72) Inventors: Abhishek Banerjee, Houston, TX (US); Matthew E. Stevens, Houston, TX (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 233 days.

(21) Appl. No.: 15/420,657

(22) Filed: Jan. 31, 2017

(65) Prior Publication Data
US 2018/0219487 A1    Aug. 2, 2018

(51) Int. Cl.
  *G06F 1/26* (2006.01)
  *H02B 1/20* (2006.01)
  *H02B 1/34* (2006.01)
  *H02M 7/04* (2006.01)

(52) U.S. Cl.
  CPC ............. *G06F 1/266* (2013.01); *H02B 1/20* (2013.01); *H02B 1/34* (2013.01)

(58) Field of Classification Search
  CPC .. G06F 1/263; G06F 1/30; G06F 1/266; H02J 9/08; H05K 7/1457; H05K 7/1492; H02B 1/20; H02B 1/34
  See application file for complete search history.

(56) References Cited

U.S. PATENT DOCUMENTS

| | | | |
|---|---|---|---|
| 6,301,095 B1 | 10/2001 | Laughlin | |
| 7,173,821 B2 | 2/2007 | Coglitore | |
| 8,773,861 B2 | 7/2014 | Ross | |
| 2003/0005339 A1* | 1/2003 | Cohen | G06F 1/26 713/300 |
| 2006/0262464 A1* | 11/2006 | Bemat | H02J 1/102 361/18 |
| 2011/0013348 A1 | 1/2011 | Seibold | |
| 2011/0304211 A1* | 12/2011 | Peterson | G06F 1/263 307/48 |
| 2015/0189787 A1 | 7/2015 | Bailey | |
| 2015/0357865 A1 | 12/2015 | Bailey | |

OTHER PUBLICATIONS

Culbertso et al., "Low Power Technology: The Modern Distributed Power Architecture," 2017, pp. 1-9, Available at: <mouser.com/applications/low-power-modern-distributed-architecture/>.

* cited by examiner

*Primary Examiner* — Rexford N Barnie
*Assistant Examiner* — Elim Ortiz
(74) *Attorney, Agent, or Firm* — Hewlett Packard Enterprise Patent Department

(57) ABSTRACT

In various examples, a system comprises a rack-mountable power distribution unit (PDU). The PDU may: receive an alternating current (AC) power feed, convert the AC to a direct current (DC) power pool, determine an amount of available amount of power of the DC power pool to be delivered to devices electrically coupled to the PDU, and output the DC power pool to the devices coupled to the PDU based on the amount of available power.

15 Claims, 4 Drawing Sheets

POWER DISTRIBUTION UNITS

BACKGROUND

A power distribution unit (PDU) is a device that receives power, and has multiple outputs to distribute power to devices connected to the outputs.

BRIEF DESCRIPTION OF THE DRAWINGS

The following detailed description references the drawings, wherein.

DETAILED DESCRIPTION

In data centers, server rooms, power is distributed to rack mountable electrical devices, e.g. servers, appliances, switches and the like via power distribution units (PDUs). In many racks, the PDU typically receives an alternating current (AC) feed to the devices mounted in the rack. Typically, each electrical device has at least one switching power supply that converts AC power to direct current (DC) power that the electric components of each device, and each power supply is electrically coupled to the PDU.

There are some issues associated with including power supplies in rack-mountable devices, however. As an example, each power supply consumes a significant amount of space that could be used for additional components (e.g. additional processors, memory, or the like) if the power supply did not have to be included in an enclosure of the computing device. Power supplies also require cooling, The techniques of this disclosure propose to move the conversion of AC power to DC power from the on-device power supply, to the PDU. More particularly, the PDU converts AC power from a utility or an uninterruptible power supply (UPS) to a DC power pool (e.g. 12V, 48V, or another DC rail commonly used) in computing devices for use by rack-mounted devices that are electrically coupled to the PDU.

Additionally, the PDU has software, hardware, and/or firmware to track the total available amount of power that the PDU can provide, and the amount of available power from one or more pools that the PDU provides to the devices. The PDU can reallocate power from pool if additional power becomes available, e.g. due to a device failure or in response to AC power coming into the PDU from an AC feed.

Figure 1:
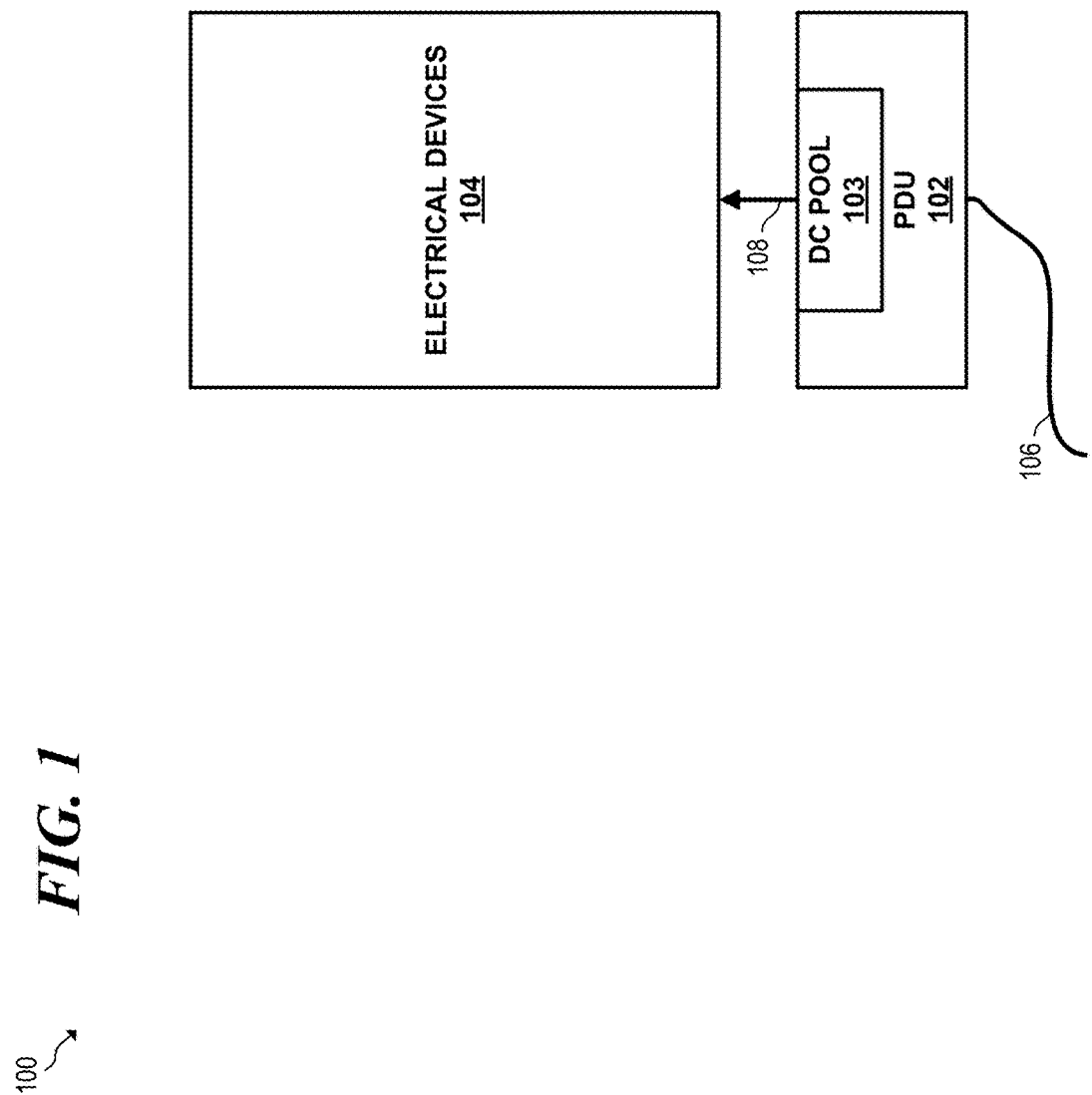
FIG. 1 is a block diagram of an example system for distributing direct current (DC) power.

FIG. 1 is a conceptual diagram of an example system 100 for converting power. In the example of FIG. 1, system 100 comprises a PDU 102. PDU 102 may comprise at least one output or outlet for providing power. In various examples, PDU 102 may be rack-mountable and may conform to an N-U form factor, wherein "N" is a positive integer, and U corresponds to a standard height unit of a rack.

PDU 102 is coupled to an AC power feed 106 and to electrical devices 104. PDU 102 receives the AC feed via at least one cable, and converts AC power feed 106 to a DC power pool 103. In some examples, the DC power pool may comprise a 12V, 48V power pool, or the like. In various examples, PDU 102 may convert AC power feed 106 to DC power pool 103 using a single rectifier, double rectifier, or other power conversion technique.

PDU 102 transmits the DC power pool to electrical devices 104. Although only a single connection is illustrated in the example of FIG. 1, PDU 102 may comprise multiple connections and/or connectors to electrical devices 104.

In examples according to this disclosure, PDU 102 may comprise hardware, software, and/or firmware. PDU 102 may monitor the amount of power provided via AC power feed 106, the amount of converted power of DC pool 103. PDU 102 may also monitor the amount of power consumed by electrical devices 104.

In various examples, PDU 102 may determine the power consumed by electrical devices 104. If PDU determines that an amount of consumed power of DC DC pool 103 has changed, e.g. if one of electrical devices 104 fails and stops consuming power, PDU 102 may adjust the DC power pool outputted to devices 104. In the example where a device fails and stops consuming power, PDU 102 can output the power previously consumed by the failed device to the still-functioning electrical devices 104. By supplying the additional or remaining power to electrical devices 104, the still-functioning devices may be able to operate at a higher level of performance (e.g. at a higher clock speed, with additional cooling, etc.

Figure 2:
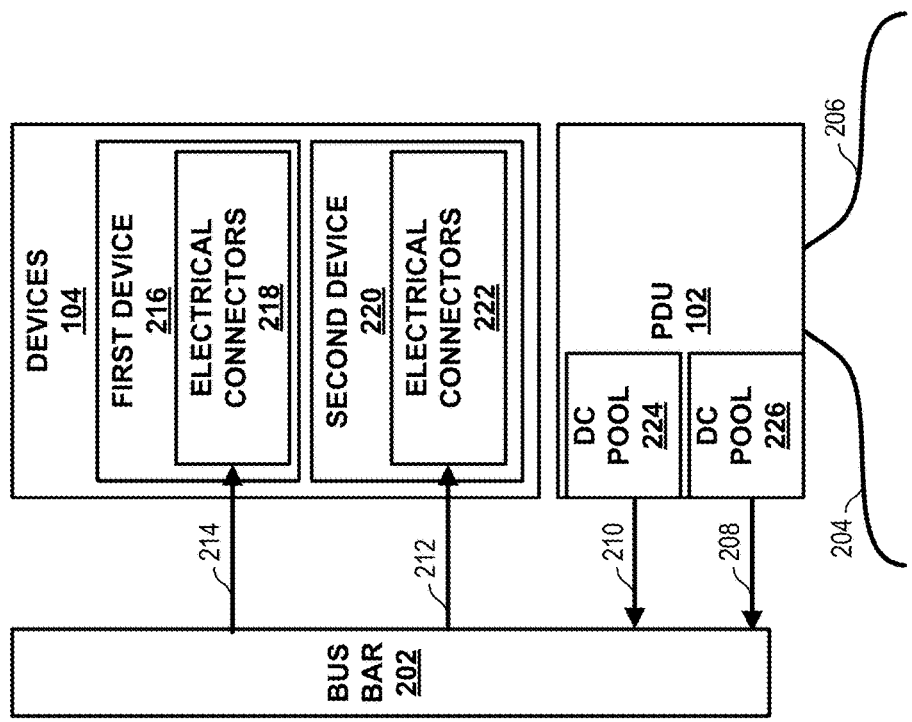
FIG. 2 is a block diagram of another example computing system for converting power.

FIG. 2 is a bounce diagram of another example system 200 for converting power. System 200 may be similar to system 100 of FIG. 1. System 200 comprises PDU 102, devices 104, and a bus bar 202.

In the example of FIG. 2, PDU 102 receives a first AC power feed 204, and a second AC feed 206. PDU 102 may receive power from multiple AC feed so that in the event of a power failure from a supplier of one of the feeds, PDU 102 may continue to provide power using the other feed.

PDU 102 converts first AC feed 204 to a first DC pool 224 and a second DC pool 226. In the example of FIG. 2, PDU 102 provides first DC pool 224 to bus bar 202 via another electrical connection 210. Bus bar 202 may comprise a strip comprising a plurality of outlets and/or connectors that output power supplied from DC pool 224 and 12V DC pool 226. Although both first 12V DC pool 224 and second DC pool 226 are illustrated as being coupled to a single bus bar 202, each pool may be coupled to a different bus bar in various examples.

Bus bar 202 may comprise a plurality of connectors, e.g. connector 214, and connector 212. Each connector of bus bar 202 may protrude and/or extend from bus bar 202. Each connector may be disposed to connect to a plurality of electrical connectors of a device to deliver power from a DC pool to that device. In the example of FIG. 2, connector 214 may couple to plurality of electrical connectors 218 of first device 216, and connector 212 may couple to plurality of electrical connectors 222 of second device 220. Connectors 212, 214 may protrude from the PDU, and couple to bus bar 202. Each connector may couple to one of devices 104.

In various examples, a connector, e.g. connector 214, may couple to a plurality of connectors of a device, e.g. a plurality of electrical connectors of first device 216. In some examples, the plurality of connectors may comprise edge connectors of a printed circuit board. In some examples, the fingers may comprise gold finger connectors.

In some examples, connector 214 may comprise two connectors from two different DC pools. One connector may be coupled to DC pool 224, and the other connector may be coupled to DC pool 226. Both connectors from may be coupled to a device, e.g. first device 216. By coupling connectors that output power a first and a second DC pool, and which originate from different AC feeds, PDU 102 can provide redundant power to a device in the case that one of the DC pools fails.

In various examples, PDU 102 may determine that the power consumption of from DC pool 224 or 226 by a device, e.g. first device 216 or second device 220, has changed. The amount of power consumed from a DC may change, e.g. if one of enters a lower-power state if one of devices 104 fails. In the case that one of devices 104 fails or consumes less power, PDU 102 may determine that additional power is available in a pool, e.g. DC pool 224. Responsive to determining that DC pool 224 has additional available power, PDU 102 may adjust the amount of output power to other devices coupled to DC pool 224 based on the change in the consumed power of the 12V DC pool.

In some examples, adjusting the amount of power may comprise increasing the amount of power outputted to a device. By outputting additional power to a device, the device may operate at a higher clock frequency, with additional cooling, or generally at higher performance. In some cases, the amount of power consumed by devices 104 may increase. However, it may still be possible to operate devices 104, e.g. in a lower performance state, even if PDU 102 supplies less power to each coupled device. In such cases, PDU 102 may adjust the outputted power to each of devices 104 by decreasing the amount of outputted power.

In some examples, the amount of power available to PDU 102 may change. The amount of power available to PDU 102 may change, e.g. if the amount of power delivered via an AC feed, e.g. AC feed 204 and/or 206 increases or decreases. Responsive to determining that he amount of power in a 12V pool converted from a corresponding AC feed, has changed, PDU 102 may adjust the outputted power to devices 104 based on the changed available power. If the available power in a pool increases, PDU 102 may increase the outputted power to devices 104. If the amount of available power in a pool decreases, PDU 102 may decrease the amount of power outputted to devices 104.

Figure 3:
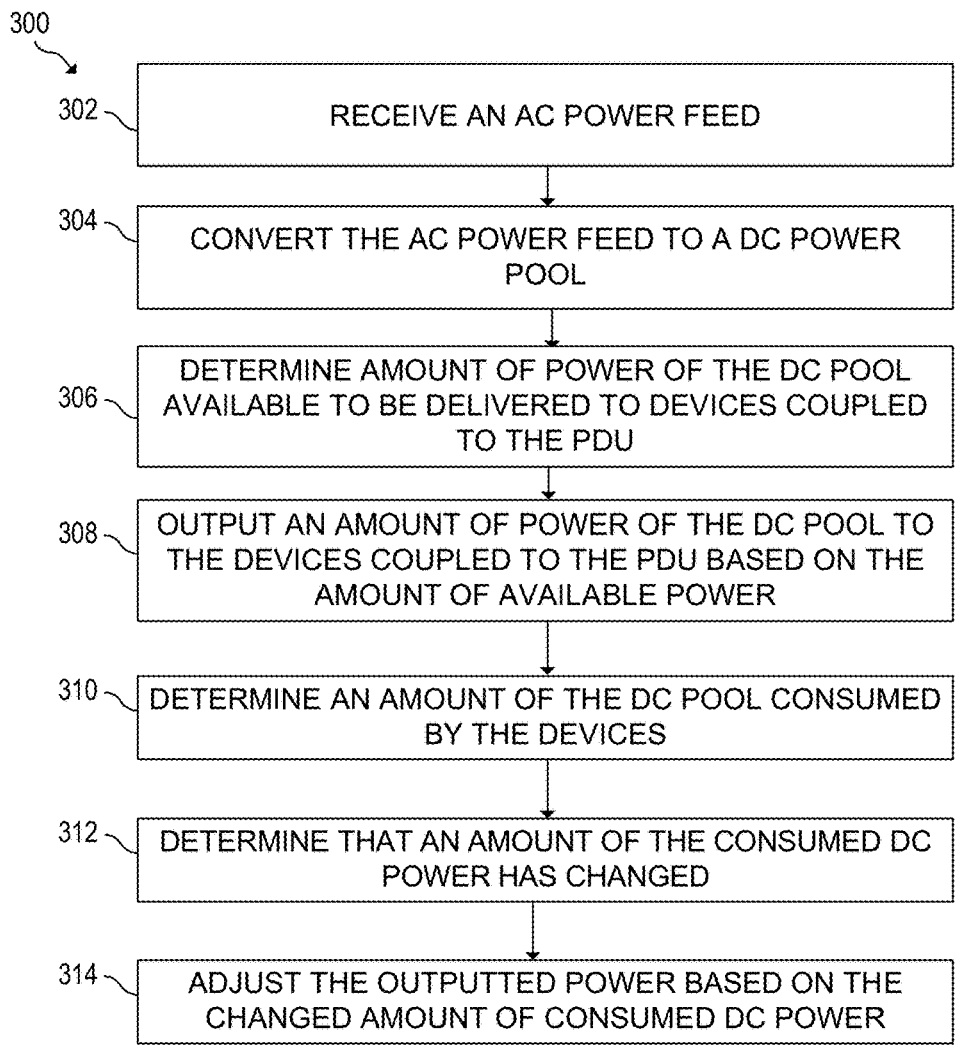
FIG. 3 is a flowchart of an example method for converting power.

FIG. 3 is a flowchart of another example method 300 for converting power. Method 300 may be described below as being executed or performed by a system or device, for example, system 100 of FIG. 1 or system 200 of FIG. 2. Other suitable systems and/or computing devices may be used as well. Method 300 may be implemented in the form of executable instructions stored on at least one machine-readable storage medium of the system and executed by at least one processor of the system.

Alternatively or in addition, method 300 may be implemented in the form of electronic circuitry (e.g., hardware). In alternate examples of the present disclosure, one or more blocks of method 300 may be executed substantially concurrently or in a different order than shown in FIG. 3. In alternate examples of the present disclosure, method 300 may include more or fewer blocks than are shown in FIG. 3. In some examples, one or more of the blocks of method 300 may, at certain times, be ongoing and/or may repeat.

Method 300 may start at block 302 at which point, as described above, a PDU (e.g. PDU 102) may receive an alternating current (AC) power feed. In some examples, block 302 may comprise receiving a first AC power feed from a first AC source and a second AC power feed from a second AC source.

In various examples, PDU 102 may be coupled to a bus bar, and the bus bar may comprise a plurality of connectors, wherein each of the plurality of connectors is coupled to one of the devices. In some examples, the plurality of connectors protrude from the bus bar and couple to one of the devices. In various examples, one of the connectors of the bus bar may be disposed to couple to one of the device via a plurality of electrical connectors of the one of the devices.

At block 304, the PDU may convert AC power feed to a twelve volt (12V) direct current (DC) power pool. In some examples, block 303 may comprise converting the first AC power feed (of block 302) to a first 12V DC power pool, and converting the second AC power pool (as described with respect to block 302) to a second DC power pool. At block 306, the PDU may determine an amount of power of the DC pool available to be delivered to devices electrically coupled to the PDU.

At block 308, the PDU may output an amount of power of the DC pool to the devices coupled to the PDU based on the amount of available power. In some examples, outputting the amount of power of the 12V pool may comprise outputting the first 12V power pool and the second 12V power pool to one of the devices.

At block 310, PDU 102 may determine an amount of DC power of the pool consumed by the devices. At block 312, PDU 102 may determine that an amount of the consumed DC power has changed. In some examples, determining that the amount of consumed DC power has changed may comprise determining that one of the coupled electrical devices has failed, shutoff, or has greatly increased or decreased power consumption.

At block 314, PDU 102 may adjust the output power to the devices based on the changed DC power that is consumed. In some examples, adjusting the power may comprise re-routing or re-distributing the amount of power distributed to the electrically-coupled devices responsive to determining the amount of consumed or available power has changed.

Figure 4:
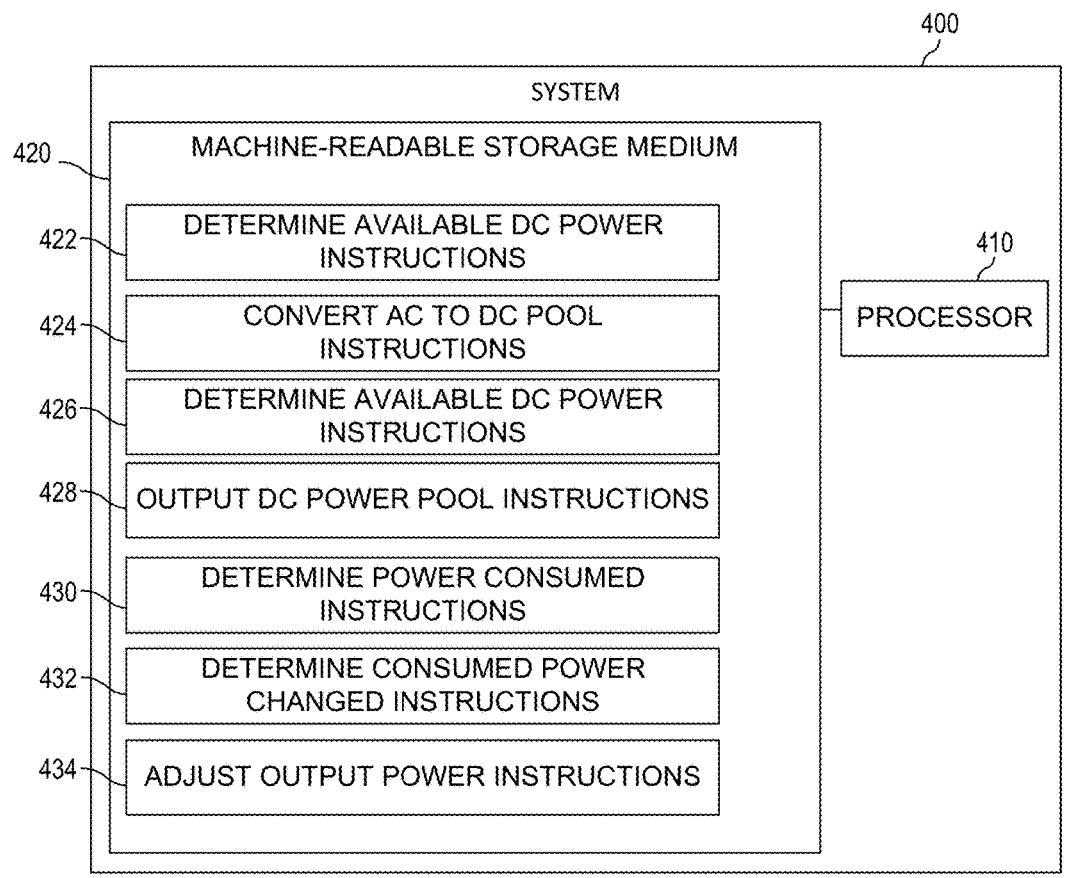
FIG. 4 is a block diagram of an example system for converting power.

FIG. 4 is a block diagram of an example system for converting power. System 400 may be similar to system 100 of FIG. 1 or system 200 of FIG. 2, for example. In the example of FIG. 4, system 400 includes a processor 410 and a machine-readable storage medium 420. In some examples, processor 410 may comprise a PDU (e.g. PDU 102). In some examples, chassis manager 110 may comprise logic and may not comprise processor 410.

Storage medium 420 is non-transitory in various examples. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 410 may be one or more central processing units (CPUs), FGPAs, ASICs, digital signal processors (DSPs), microprocessors, and/or other hardware devices suitable for retrieval and execution of instructions stored in machine-readable storage medium 420. In the particular examples shown in FIG. 4, processor 410 may fetch, decode, and execute instructions 422, 424, 424, 426, 428, 430, 432, to convert power. As an alternative or in addition to retrieving and executing instructions, processor 410 may include one or more electronic circuits comprising a number of electronic components for performing the functionality of one or more of the instructions in machine-readable storage medium 420. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 420 may be any electronic, magnetic, optical, or other physical storage device that stores executable instructions. Thus, machine-readable storage medium 420 may be, for example, Random Access Memory (RAM), an Electrically-Erasable Programmable Read-Only Memory (EEPROM), a storage drive, an optical disc, and the like. Machine-readable storage medium 420 may be disposed within system 400, as shown in FIG. 4. In this situation, the executable instructions may be "installed" on the system 400. Alternatively, machine-readable storage medium 420 may be a portable, external or remote storage medium, for example, that allows system 400 to download the instructions from the portable/external/remote storage medium. In this situation, the executable instructions may be part of an "installation package". As described herein, machine-readable storage medium 420 may be encoded with executable instructions to allow sharing of USB ports.

Referring to FIG. 4, receive AC feed instructions 422, when executed, may cause processor 410 to: receive an alternating current (AC) power feed. In some examples, receive AC feed instructions 422, when executed, may cause processor 410 to receive a first AC power feed from a first AC source and a second AC power feed from a second AC source.

Convert AC to DC pool instructions 424 may further cause processor 410 to convert the AC power feed to a twelve volt (12V) direct current (DC) power pool. In some examples, convert AC to DC pool instructions 422 may cause processor 410 to convert the first AC power feed to a first DC power pool, and convert the second AC power feed to a second DC power pool.

Determine available DC power instructions 424, when executed, may cause processor 410 to: determine an amount of available amount of power of the DC power pool available to be delivered to devices electrically coupled to the PDU.

Output 12V power pool instructions 428 may further cause processor 410 to output the DC power pool to the devices coupled to the PDU based on the determined amount of available power. In some examples, output instructions pool instructions 428, when executed, may cause processor 410 to output the first DC power pool and the second DC power pool to one of the coupled devices. In various examples, output DC power pool instructions 428, when executed, may further cause processor 410 to output the first 12V power pool to a first one of the electrically coupled devices, and output the second 12V power pool to a second, different one of the electrically coupled devices.

Determine power consumed instructions 430, when executed, cause processor 410 to determine an amount of power of the DC power pool consumed by the electrical devices coupled to the PDU. Determine consumed power changed instructions 432, when executed, cause processor 410 to determine that the amount of the consumed DC power pool has changed. In some examples, to determine that the amount of consumed DC power has changed, processor 410 may determine that a device coupled to the PDU has failed, shutoff, or otherwise changed power consumption.

Adjust outputted power instructions 434, when executed, cause processor 410 to adjust the power outputted to the electrically devices based on the changed amount of the consumed DC power pool. In some examples, adjust outputted power instructions 434, may cause processor 410 to adjust the power comprise instructions that, when executed, cause the processor to adjust the outputted power based on the changed amount of the consumed DC power pool.

The invention claimed is:

1. A method comprising:
   receiving, by a power distribution unit (PDU), an alternating current (AC) power feed;
   converting, by the PDU, the AC power feed to a direct current (DC) power pool;
   determining, by the PDU, an amount of power of the DC pool available to be delivered to devices electrically coupled to the PDU;
   determining, by the PDU, an amount of power of the DC pool consumed by the devices coupled to the PDU;
   outputting, by the PDU, an amount of power of the DC pool to the devices coupled to the PDU based on the amount of available power and the amount of the power of the DC pool consumed by the devices;
   determining, by the PDU, that an amount of the consumed DC power has changed; and
   adjusting the outputted power to the devices based on the changed DC power;
   wherein determining that the amount of the consumed DC power has changed comprises determining that one of the devices has failed and adjusting the outputted power comprises increasing the amount of the available power of the DC pool outputted to each of the devices still operating.

2. The method of claim 1, wherein the PDU is rack-mountable, and
   wherein the PDU is coupled to a bus bar,
   wherein the bus bar comprises a plurality of connectors, wherein each of the plurality of connectors is coupled to one of the devices.

3. The method of claim 1, wherein the plurality of connectors protrude from the bus bar and couple to one of the devices.

4. The method of claim 2, wherein one of the connectors of the bus bar is disposed to couple to one of the devices via a plurality of electrical connectors of the one of the devices.

5. The method of claim 1, wherein adjusting the outputted power is based on an available amount of power of the DC pool.

6. The method of claim 1, wherein receiving the AC comprises:
   receiving a first AC power feed from a first AC source and a second AC power feed from a second AC source;
   converting the first AC power feed to a first DC power pool;
   converting the second AC power feed to a second DC power pool; and
   outputting, by the PDU, the first DC power pool and the second DC power pool to one of the devices.

7. A device comprising:
   a rack-mountable power distribution unit (PDU) comprising a processor, the processor to:
   receive an alternating current (AC) power feed;
   convert the AC power feed to a first current (DC) power pool;
   determine an amount of available amount of power of the DC power pool to be delivered to devices electronically coupled to the PDU;
   determine an amount of DC power consumed by the electrical devices coupled to the PDU;
   output the DC power pool to the devices coupled to the PDU based on the amount of available power;
   determine that an amount of consumed power of the DC pool has changed; and adjust the DC power pool outputted to the electronically coupled devices based on the changed consumed DC power;

wherein to determine that amount of consumed power of the DC pool has changed, the PDU to: determine whether one of the devices has failed and to adjust the DC power pool outputted comprises increasing the amount of the available power of the DC pool outputted to each of the devices still operating.

8. The system of claim 7, wherein the PDU is rack-mountable, and wherein the PDU is coupled to a bus bar, wherein the bus bar comprises a plurality of connectors, wherein each of the plurality of connectors are coupled to each of the electrically coupled devices.

9. The system of claim 7, wherein the plurality of connectors protrude from the PDU and couple to the bus bar.

10. The system of claim 7, wherein the plurality of connectors of the bus bar are disposed to couple to a corresponding plurality of electrical connectors of the electrical devices.

11. The system of claim 7, wherein to receive the AC power feed, the PDU to:

receive a first AC power feed from a first AC source and a second AC power feed from a second AC source;

convert the first AC power feed to a first DC power pool;

convert the second AC power feed to a second DC power pool; and output the first DC power pool and the second DC power pool to one of the electronically coupled devices.

12. A non-transitory computer-readable storage medium comprising instructions stored thereon that, when executed, cause a processor of a power distribution unit (PDU) to:

receive an alternating current (AC) power feed;

convert the AC power feed to a direct current (DC) power pool;

determine an amount of available power of the DC power pool available to be delivered to devices electronically coupled to the PDU;

output the DC power pool to the devices coupled to the PDU based on the determined amount of available power;

determine an amount of power of the DC power pool consumed by the electrical devices coupled to the PDU;

determine that one of the coupled devices has failed;

determine that the amount of the consumed DC power pool has changed; and adjust the power outputted to the electrically coupled devices based on the changed amount of the consumed DC power pool, wherein adjust the power outputted comprises increasing the amount of the available power of the DC pool outputted to each of the devices still operating.

13. The non-transitory computer-readable storage medium of claim 12, wherein the instructions that cause the processor to receive the AC power feed comprise instructions that, when executed, cause the processor to:

receive a first AC power feed from a first AC source and a second AC power feed from a second AC source;

convert the first AC power feed to a first DC power pool;

convert the second AC power feed to a second DC power pool.

14. The non-transitory computer-readable storage medium of claim 13, wherein the instructions that cause the processor to output the DC power pool comprise instructions that, when executed, cause the processor to:

output the first DC power pool and the second DC power pool to one of the coupled devices.

15. The non-transitory computer-readable storage medium of claim 13, wherein the instructions that cause the processor to receive the AC power feed comprise instructions that, when executed, cause the processor to:

output the first DC power pool to a first one of the electronically coupled devices; and output the second DC power pool to a second, different one of the electrically coupled devices.

* * * * *